US012281661B2

(12) United States Patent
Kim et al.

(10) Patent No.: US 12,281,661 B2
(45) Date of Patent: Apr. 22, 2025

(54) HYDRAULIC MACHINE AND METHOD OF CONTROLLING THE SAME

(71) Applicant: Volvo Construction Equipment AB, Eskilstuna (SE)

(72) Inventors: Younghun Kim, Gyeongsangnam-do (KR); Sangkyu Joo, Gyeongsangnam-do (KR)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 0 days.

(21) Appl. No.: 17/966,003

(22) Filed: Oct. 14, 2022

(65) Prior Publication Data

US 2023/0117287 A1 Apr. 20, 2023

(30) Foreign Application Priority Data

Oct. 15, 2021 (KR) ........................ 10-2021-0137719

(51) Int. Cl.
*F15B 13/044* (2006.01)
*F15B 1/04* (2006.01)

(52) U.S. Cl.
CPC .............. *F15B 13/044* (2013.01); *F15B 1/04* (2013.01)

(58) Field of Classification Search
CPC ........ F15B 11/042; F15B 21/087; F15B 1/04; F15B 13/044; E02F 9/123
See application file for complete search history.

(56) References Cited

U.S. PATENT DOCUMENTS 5,197,283 A * 3/1993 Kagiwada ........... F16H 61/4139 60/451
6,378,303 B1 * 4/2002 Higuchi ................ E02F 9/2239 60/468

(Continued)

FOREIGN PATENT DOCUMENTS

DE 102006040459 A1 3/2007
EP 1479920 A2 11/2004

(Continued)

OTHER PUBLICATIONS

Extended European Search Report for EP Patent Application No. 22199937.8, mailed Mar. 1, 2023, 11 pages.

*Primary Examiner* — Kenneth Bomberg
*Assistant Examiner* — Daniel S Collins
(74) *Attorney, Agent, or Firm* — Sage Patent Group

(57) ABSTRACT

A hydraulic machine. A high pressure line allows working fluid to flow into a hydraulic motor. A low pressure line allows working fluid to flow out of the hydraulic motor. High pressure line valves open and close the high pressure line. Low pressure line valves open and close the low pressure line. An operator input device inputs a command to control movement of the hydraulic motor. A control unit controls the high pressure line valves and the low pressure line valves to be opened and closed by receiving the command from the operator input device. The control unit controls the high pressure line valves to have a normalized flow factor $K_{vHP}$, and controls the low pressure line valves to have a normalized flow factor $K_{vLP}$, where $K_{vLP}<K_{vHP}$ when a normalized flow factor $K_{vcmd}$ corresponding to the command is $0<K_{vcmd}<1$.

18 Claims, 6 Drawing Sheets

(56) References Cited

U.S. PATENT DOCUMENTS

| | | | | |
|---|---|---|---|---|
| 6,775,974 | B2 * | 8/2004 | Tabor | F15B 9/09 91/435 |
| 2003/0110934 | A1 * | 6/2003 | Linerode | E02F 9/2203 91/459 |
| 2010/0263364 | A1 * | 10/2010 | Tsutsui | B66C 23/86 60/466 |
| 2012/0285152 | A1 | 11/2012 | Sugano et al. | |
| 2013/0098012 | A1 * | 4/2013 | Opdenbosch | F15B 1/024 60/413 |
| 2014/0116038 | A1 | 5/2014 | Pfaff et al. | |
| 2021/0002867 | A1 * | 1/2021 | Muraoka | E02F 9/2285 |

FOREIGN PATENT DOCUMENTS

| | | | |
|---|---|---|---|
| JP | H10184604 | A | 7/1998 |
| WO | 20200175399 | A1 | 9/2020 |

* cited by examiner

HYDRAULIC MACHINE AND METHOD OF CONTROLLING THE SAME

CROSS REFERENCE TO RELATED APPLICATIONS

The present application claims benefit of priority to Korean Patent Application No. 10-2021-0137719, filed Oct. 15, 2021, and is assigned to the same assignee as the present application and is incorporated herein by reference.

BACKGROUND

Field

The present disclosure relates to a hydraulic machine and a method of controlling the same, and more particularly, to a hydraulic machine to which a novel valve control algorithm is applied in order to reliably control movement of a hydraulic motor and a method of controlling the same.

Description of Related Art

A hydraulic motor, in addition to a hydraulic cylinder, is a component typically used as an actuator in a hydraulic machine. Since the hydraulic motor has a high degree of rotational inertia, for example, when rotations of the motor have just started, pressure shock may occur, causing the hydraulic motor to jerk. Thus, there has been demand for a reliable hydraulic motor control algorithm able to solve such problems.

SUMMARY

Various aspects of the present disclosure provide a hydraulic motor control algorithm able to effectively overcome problems caused by the high degree of rotational inertia of a hydraulic motor.

According to an aspect, provided is a hydraulic machine including: a hydraulic motor; a high pressure line connected to the hydraulic motor to allow working fluid to flow into the hydraulic motor; a low pressure line connected to the hydraulic motor to allow working fluid to flow out of the hydraulic motor; a high pressure line valve configured to open and close the high pressure line; a low pressure line valve configured to open and close the low pressure line; an operator input device configured to input a command to control movement of the hydraulic motor; and a control unit configured to receive the command from the operator input device and control the high pressure line valve and the low pressure line valve to be opened and closed in response to the command. The control unit may control the high pressure line valve to have a normalized flow factor $K_{vHP}$, and control the low pressure line valve to have a normalized flow factor $K_{vLP}$ where $K_{vLP}<K_{vHP}$ when a normalized flow factor $K_{vcmd}$ corresponding to the command is $0<K_{vcmd}<1$.

According to another aspect, provided is a method of controlling a hydraulic machine. The method may include: receiving a command input by the operator input device; determining a normalized flow factor $K_{vcmd}$ corresponding to the command; controlling the high pressure line valve to have a normalized flow factor $K_{vHP}$; and controlling the low pressure line valve to have a normalized flow factor $K_{vLP}$ where $K_{vLP}<K_{vHP}$ when $0<K_{vcmd}<1$.

In some examples, $K_{vHP}=K_{vLP}$ when $K_{vcmd}=0$ or $K_{vcmd}=1$.

In some examples, $K_{vcmd}=K_{vHP}=K_{vLP}$ when $K_{vcmd}=0$ or $K_{vcmd}=1$.

In some examples, $K_{vLP}<K_{vcmd}<K_{vHP}$ when $0<K_{vcmd}<1$.

According to other aspects, provided are a computer program including program code for performing the operations of the above-described method of controlling a hydraulic machine when executed on a computer or a processing circuit of a control unit and a computer readable medium storing the computer program.

As set forth above, the present disclosure may provide the hydraulic motor control algorithm able to effectively overcome problems caused by the high degree of rotational inertia of the hydraulic motor.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

DESCRIPTION OF THE DRAWINGS

With reference to the appended drawings, below follows a more detailed description of aspects of the disclosure cited as examples.

DETAILED DESCRIPTION

Hereinafter, examples of the present disclosure will be described in detail with reference to the accompanying drawings. Aspects set forth below represent the necessary information to enable those skilled in the art to practice the disclosure.

Figure 1:
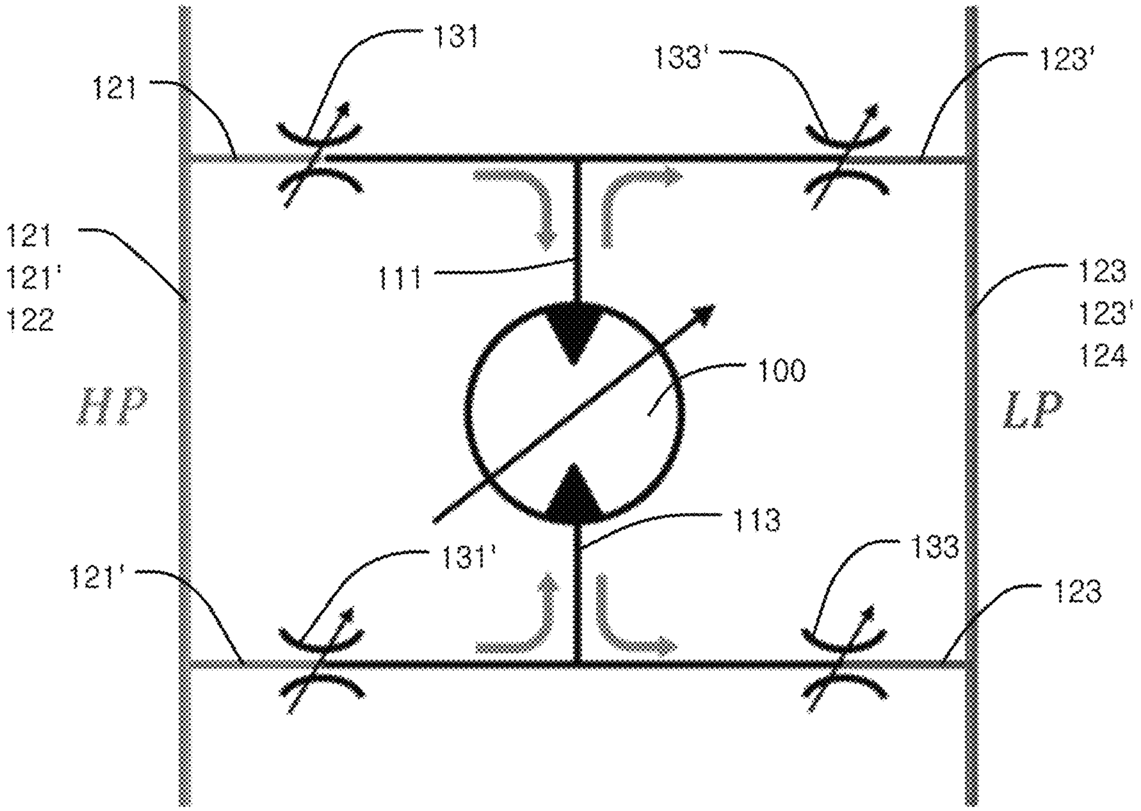
FIG. 1 is a diagram schematically illustrating a hydraulic machine according to an example of the present disclosure.

FIG. 1 is a diagram schematically illustrating a hydraulic machine according to an example of the present disclosure.

As illustrated in FIG. 1, the hydraulic machine may include a hydraulic motor 100, high pressure lines 121 and 121', low pressure lines 123 and 123', high pressure line valves 131 and 131', and low pressure line valves 133 and 133'.

In some examples, the hydraulic motor 100 may be a component for performing a swing operation (for rotating the upper body on the lower chassis with respect to the lower chassis) by providing rotational torque generated by inflow and outflow of working fluid for the upper body or for a travel operation (for driving the hydraulic machine to move forwardly or reversely or performing steering to change the orientation of the hydraulic machine to the right or left) by providing the rotating torque for a sprocket or a wheel. Thus, a heavy weight swung or driven during the swing or driving operation may be applied to the hydraulic motor 100, thereby imparting a high degree of rotational inertia to the hydraulic motor 100. The hydraulic motor 100 may have port A 111 and port B 113 through which working fluid may flow in and out. In some examples, the hydraulic motor 100 is able to rotate in both directions. The port A 111 may act as not only an inlet but also an outlet. In the same manner, the port B 113 may also act as not only an inlet, but also an outlet.

The high pressure lines 121 and 121' may be connected to the hydraulic motor 100 to allow working fluid to flow into the hydraulic motor 100. The high pressure lines 121 and 121' may include a high pressure line A 121 connected to the port A 111 and a high pressure line B 121' connected to the port B 113.

The low pressure lines 123 and 123' may be connected to the hydraulic motor 100 to allow working fluid to flow out of the hydraulic motor 100. The low pressure lines 123 and 123' may include a low pressure line A 123' connected to the port A 111 and a low pressure line B 123 connected to the port B 113.

The high pressure line valves 131 and 131' may open and close the high pressure lines 121 and 121'. The high pressure line valves 131 and 131' may include a high pressure line valve A 131 opening and closing the high pressure line A 121 and a high pressure line valve B 131' opening and closing the high pressure line B 121'.

The low pressure line valves 133 and 133' may open and close the low pressure lines 123 and 123'. The low pressure line valves 133 and 133' may include a low pressure line valve A 133' opening and closing the low pressure line A 123' and a low pressure line valve B 133 opening and closing the low pressure line B 123.

The hydraulic machine may include an operator input device for inputting commands to control movement of the hydraulic motor 100. In some examples, the operator input device may be provided in the form of a joystick, but the present disclosure is not limited thereto.

In addition, the hydraulic machine may include a control unit (not shown) to receive commands from the operator input device and to control the opening and closing of the high pressure line valves 131 and 131' and the low pressure line valves 133 and 133' in response to the received commands. The control unit may control the high pressure line valves 131 and 131' to have a normalized flow factor $K_{vHP}$ and control the low pressure line valves 133 and 133' to have a normalized flow factor $K_{vLP}$.

In some examples, when an command to rotate the hydraulic motor 100 in a first direction is input to the operator input device, the control unit may open the high pressure line valve A 131 by a degree of opening corresponding to $K_{vHP}$ ($K_{vHP}>0$) and open the low pressure line valve B 133 by a degree of opening corresponding to $K_{vLP}$ ($K_{vLP}>0$), and may close the high pressure line valve B 131' and the low pressure line valve A 133' (i.e., the high pressure line valve B 131' and the low pressure line valve A 133' may be controlled so that $K_{vHP}=K_{vLP}=0$).

In contrast, when an command to rotate the hydraulic motor 100 in a second direction opposite to the first direction is input to the operator input device, the control unit may open the high pressure line valve B 131' by a degree of opening corresponding to $K_{vHP}$ ($K_{vHP}>0$) and open the low pressure line valve A 133' by a degree of opening corresponding to $K_{vLP}$ ($K_{vLP}>0$), and may close the high pressure line valve A 131 and the low pressure line valve B 133 (i.e., the high pressure line valve A 131 and the low pressure line valve B 133 are controlled so that $K_{vHP}=K_{vLP}=0$).

In some examples, when a command to stop the hydraulic motor rotating in the first direction is input to the operator input device (i.e., when the operator input device is moved to the neutral position), the high pressure line valve B and the low pressure line valve A are maintained in a closed state. Here, the control unit may temporarily and slightly open the low pressure line valve A to prevent rebounding as the speed of the rotation approaches zero (0) and then close the low pressure line valve A when the rotation is completely stopped.

In the same manner, when a command to stop the hydraulic motor rotating in the second direction is input to the operator input device, the high pressure line valve A and the low pressure line valve B are maintained in a closed state. Here, when the speed of the rotation approaches 0, the control unit may temporarily and slightly open and then close the low pressure line valve B.

In some examples, the control unit may include a processing circuit and a storage medium. For example, the processing circuit may include one or more among a suitable central processing unit, a multiprocessor, a microcontroller, a digital signal processor, and the like configured to execute software instructions stored in the storage medium. Furthermore, the processing circuit may include at least one application-specific integrated circuit (ASIC) or field-programmable gate array (FPGA). The storage medium may include, for example, a persistent storage that may be one or a combination of a magnetic memory, an optical memory, a solid state memory, or the like.

Figure 2:
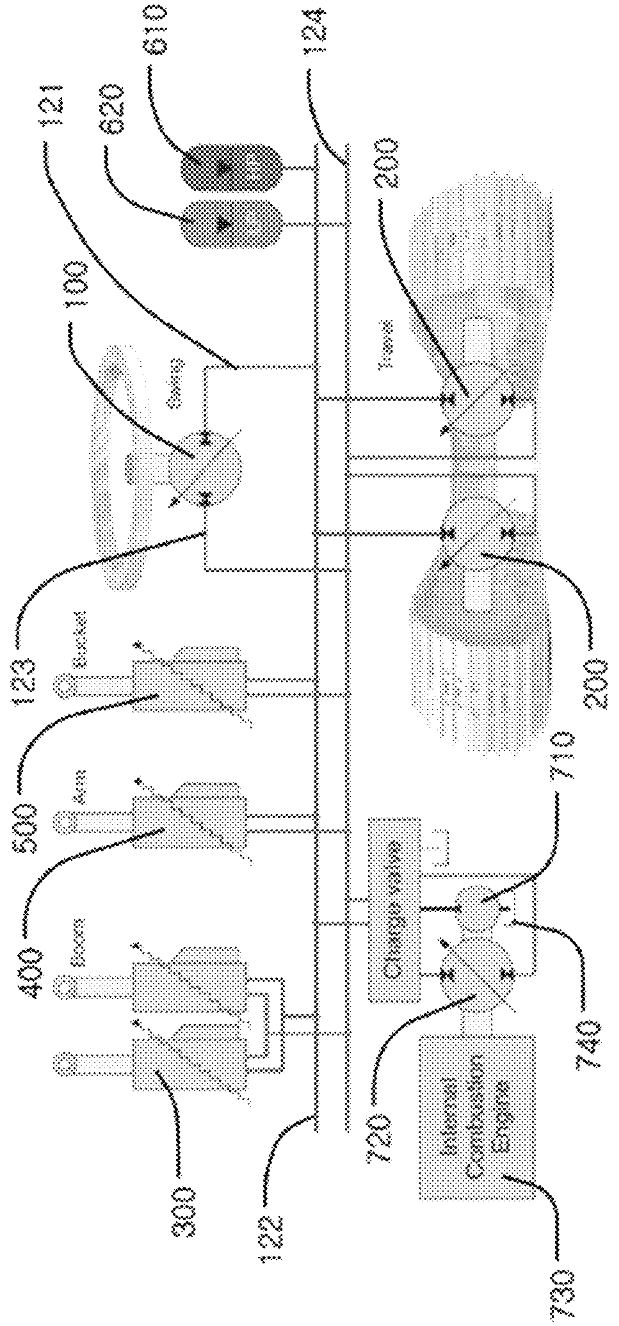
FIG. 2 schematically illustrates the hydraulic machine according to an example of the present disclosure.

FIG. 2 schematically illustrates the hydraulic machine according to an example of the present disclosure.

The hydraulic machine according to the present disclosure may include any machine having the hydraulic motor 100 as illustrated in FIG. 1, as an actuator. For example, the hydraulic machine according to the present disclosure may include heavy equipment. In particular, the hydraulic machine according to the present disclosure may include an excavator illustrated in FIG. 2. However, the present disclosure is not limited thereto.

As illustrated in FIG. 2, in some examples, the hydraulic machine may include one or more hydraulic cylinders 300, 400, and 500, a high pressure accumulator 610, and a low pressure accumulator 620, in addition to the elements illustrated in FIG. 1.

In some examples, the hydraulic cylinders 300, 400, and 500 may include a boom cylinder 300 for actuating a boom, an arm cylinder 400 for actuating an arm, and a bucket cylinder 500 for actuating a bucket.

The high pressure accumulator 610 is connected to the high pressure lines. Thus, high pressure working fluid accumulated in the high pressure accumulator 610 may be supplied to the actuators 100 to 500 through the high pressure lines.

The low pressure accumulator 620 is connected to the low pressure lines. Thus, working fluid discharged from the actuators 100 to 500 is transferred to the low pressure accumulator 620 through the low pressure lines.

In some examples, the hydraulic machine may include a tank 740 for storing working fluid.

In some examples, the hydraulic machine may include a basic pump 710 receiving working fluid from the tank 740, pressurizing the received working fluid, and transferring the pressurized working fluid toward the high pressure accumulator 610.

In some examples, the hydraulic machine may include a regenerative pump 720 receiving working fluid from the low pressure accumulator 620, pressurizing the received working fluid, and transferring the pressurized working fluid toward the high pressure accumulator 610.

In some examples, the hydraulic machine may include a driving source 730 to drive the basic pump 710 and the regenerative pump 720. The driving source 730 may be an engine.

In some examples, the one or more hydraulic motors 100 and 200 and the one or more hydraulic cylinders 300, 400, and 500 may be connected to the high pressure accumulator 610 in common. In addition, the one or more hydraulic motors 100 and 200 and the one or more hydraulic cylinders 300, 400, and 500 may be connected to the low pressure accumulator 620 in common. In this regard, in some examples, the high pressure lines respectively extending from the corresponding actuators may be joined to form a high pressure line 122, which may be connected to the high pressure accumulator 610. In addition, in some examples, the low pressure lines respectively extending from the corresponding actuators may be joined to form a low pressure line 124, which may be connected to the low pressure accumulator 620. All the actuators may only use the difference between pressures generated by the two pressure lines 122 and 124. According to this feature, a total of four (4) valves, such as the two high pressure line valves 131 and 131' allowing or blocking flow of fluid supplied through the high pressure line 122 and the two low pressure line valves 133 and 133' allowing or blocking flow of fluid discharged through the low pressure line 124, may be provided for the hydraulic motors 100 and 200. In the present disclosure, it is possible to determine the motor speed performance of the hydraulic motors 100 and 200 by controlling the normalized flow factors $K_v$ of such valves.

Figure 3:
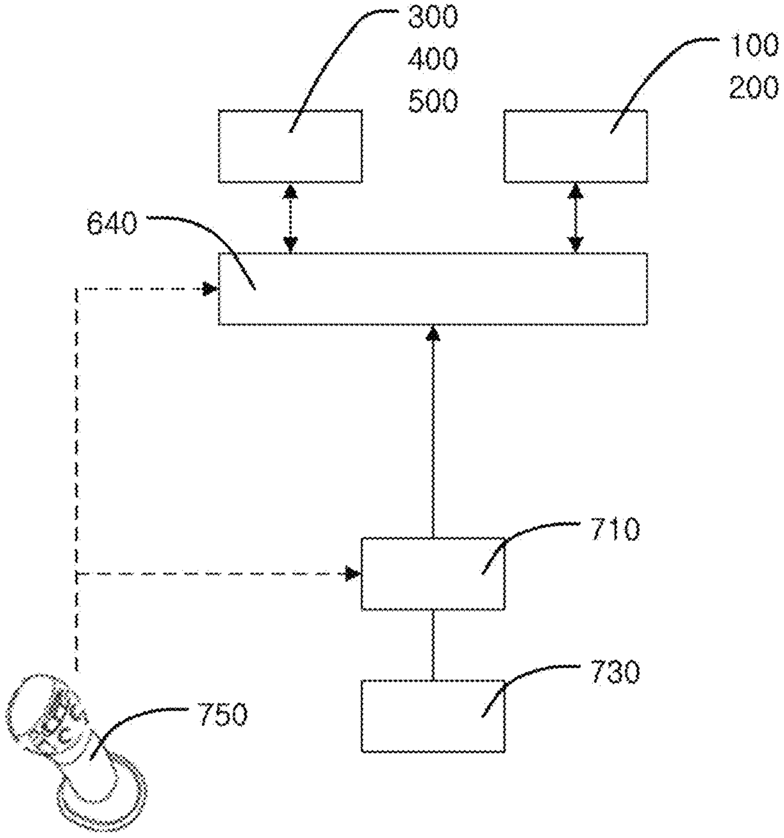
FIG. 3 is a conceptual view schematically illustrating a control system of a typical hydraulic machine.
Figure 4:
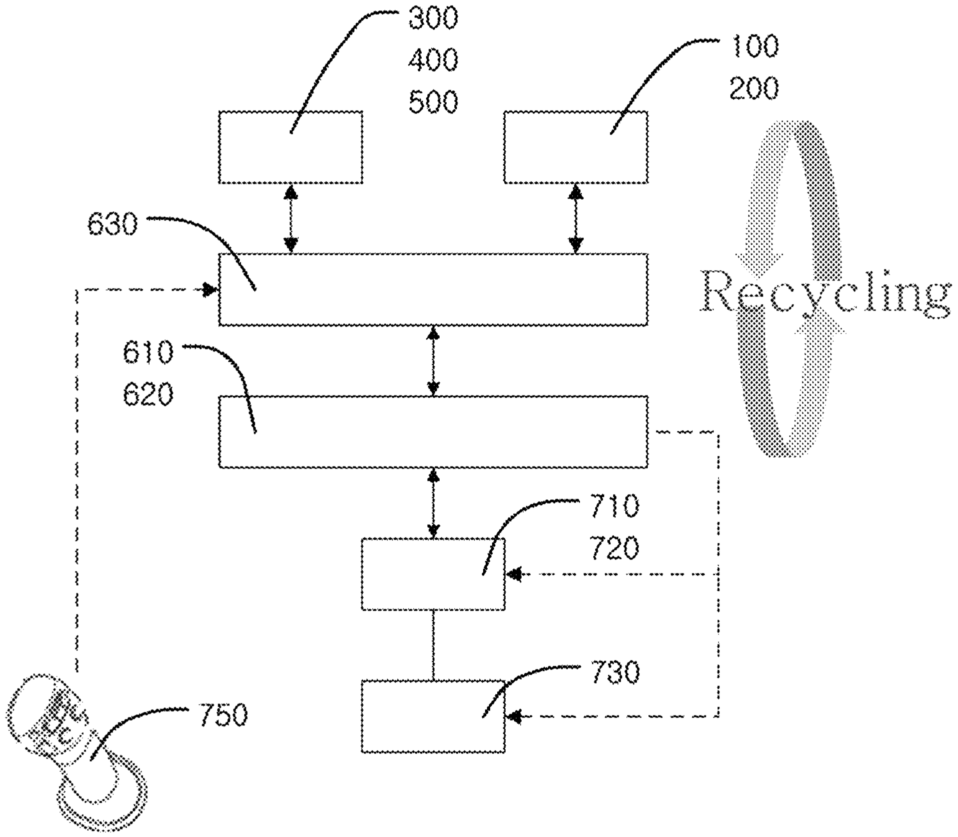
FIG. 4 is a conceptual view schematically illustrating a control system of the hydraulic machine illustrated in FIG. 2.

FIGS. 3 and 4 are conceptual views schematically illustrating a control system of a typical hydraulic machine and a control system of the hydraulic machine illustrated in FIG. 2, respectively.

As illustrated in FIG. 3, in a typical hydraulic machine, when an operator inputs a command using an operator input device 750, the pump 710 is controlled to change the flow rate of fluid discharged from the pump 710 in response to the command, and a main control valve 640 is controlled to change the flow rate (and the direction of flow) of fluid passing through the main control valve 640 in response to the command. In this manner, an intended flow rate of fluid is supplied to each of the actuators 100 to 500.

In contrast, as illustrated in FIG. 4, the hydraulic machine according to an example of the present disclosure may be configured such that working fluid supplied by the pumps 710 and 720 is accumulated in the high pressure accumulator 610 and the high pressure accumulator 610 supplies working fluid to each of the actuators 100 to 500. Thus, in a state in which the high pressure accumulator 610 is fully charged, the hydraulic machine may be operated without pressurized working fluid being supplied by the pumps 710 and 720. In a state in which the high pressure accumulator 610 is not fully charged, the pumps 710 and 720 may be operated irrespective of the input to the operator input device 750. A manifold 630 forming the high pressure lines and low pressure lines is interposed between the accumulators 610 and 620 and the actuators 100 to 500.

In some examples, a pressure within the high pressure accumulator 610 may have a predetermined pressure value (e.g., 300 bars), and a pressure within the low pressure accumulator 620 may have a predetermined pressure value (e.g., 20 bars). The control unit may control the pumps 710 and 720 so that the predetermined pressure values are maintained.

FIG. 1 will be referred to again. In the following description, a situation in which fluid is introduced into the motor 100 through the port A 111 and is discharged through the port B 113 will be described for the sake of brevity, but the following description will be applied in the same manner to a situation in which fluid is introduced into the motor 100 through the port B 113 and is discharged through the port A 111.

When a command is input by the operator input device 750, a conventional valve control algorithm controls the inflow high pressure line valve 131 and the outflow low pressure line valve 133 to have the same normalized flow factor $K_{vcmd}$ corresponding to the command. This is based on a simple idea that the inflow rate will be the same as the outflow rate since there is no other port through which fluid flows in and out excepting the port A 111 and the port B 113. However, the hydraulic motor 100 has the high degree of rotational inertia as described above, and thus, whenever $K_v$ changes, a significant difference in pressure may occur between the inflow line 121 and the outflow line 123, thereby causing pressure shock or reverse pressure shock.

For example, when it is intended to rotate the hydraulic motor 100 in the first direction, the high pressure line valve A 131 and the low pressure line valve B 133 are opened and the high pressure line valve B 131' and the low pressure line valve A 133' are closed. Here, the conventional algorithm controls the high pressure line valve A 131 and the low pressure line valve B 133 to have the same $K_v$. Thus, when the high pressure line valve A 131 is just opened, a high pressure is instantaneously supplied to the port A 111 through the high pressure line valve A 131. However, although the low pressure line valve B 133 starts to be opened at the same time, corresponding instantaneous flow of fluid from the port B 113 through the low pressure line 123 may not occur, due to the high degree of rotational inertia of the hydraulic motor 100 (e.g., the high degree of rotational inertia of the hydraulic motor 100 is caused by the heavy weight of the upper body connected thereto). As a result, pressure shock may occur in the port A 111 and torque proportional to the pressure of the motor may be instantaneously increased to exceed static inertia, thereby causing a jerk.

As another example, a situation in which the operator reduces $K_{vcmd}$ to decelerate the motor 100 will be discussed. In the same manner, the conventional valve control algorithm controls the high pressure line valve A 131 and the low pressure line valve B 133 to have the same $K_{vcmd}$ and starts to reduce the degrees of opening of the high pressure line valve A 131 and the low pressure line valve B 133. At this time, the flow rate of fluid flowing to the port A 111 through the high pressure line valve A 131 decreases, but the motor 100 having the high degree of rotational inertia draws a relatively large amount of fluid from the port A 111. As a result, a sudden pressure drop occurs in the port A 111, thereby causing reverse pressure shock. In addition, instantaneous reverse torque may have an adverse effect on the hydraulic machine. For example, a banging noise may occur in a gearbox connected to the motor 100.

Solutions for overcoming such problems, according to the present disclosure, will be described hereinafter with reference to FIGS. 5 to 7.

Figure 5:
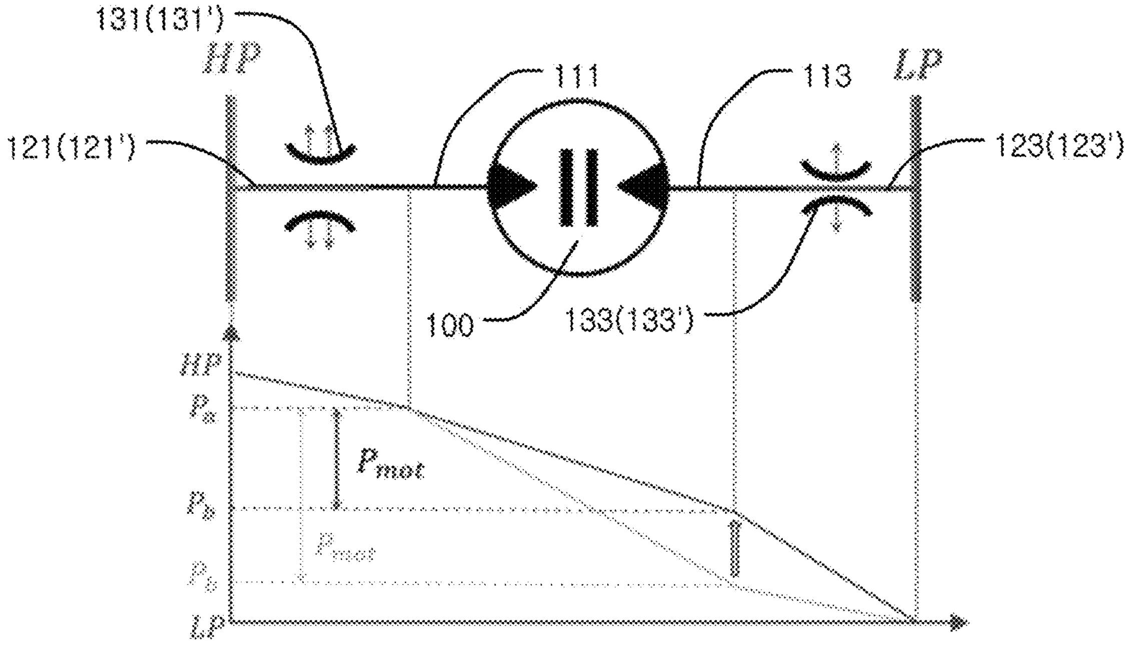
FIG. 5 is a conceptual view illustrating inlet pressure and outlet pressure of a hydraulic motor when rotation of the hydraulic motor is initiated according to an example of the present disclosure.

FIG. 5 is a conceptual view illustrating inlet pressure and outlet pressure of a hydraulic motor when rotation of the hydraulic motor is initiated according to an example of the present disclosure.

As illustrated in FIG. 5, when rotation of the motor 100 is initiated, the algorithm controls the high pressure line valve A 131 to have $K_{vHP}$ so that fluid is supplied to the motor 100 through the port A 111. However, the low pressure line valve B 133 is controlled to have $K_{vLP}$ smaller than $K_{vHP}$ so that fluid is maintained in the port B 113 for a short period of time. As a result, pressure in the port B 113 can increase, thereby preventing the pressure of the motor, that is, the difference in the pressure between the port A 111 and the port B 113 from instantaneously increasing.

Figure 6:
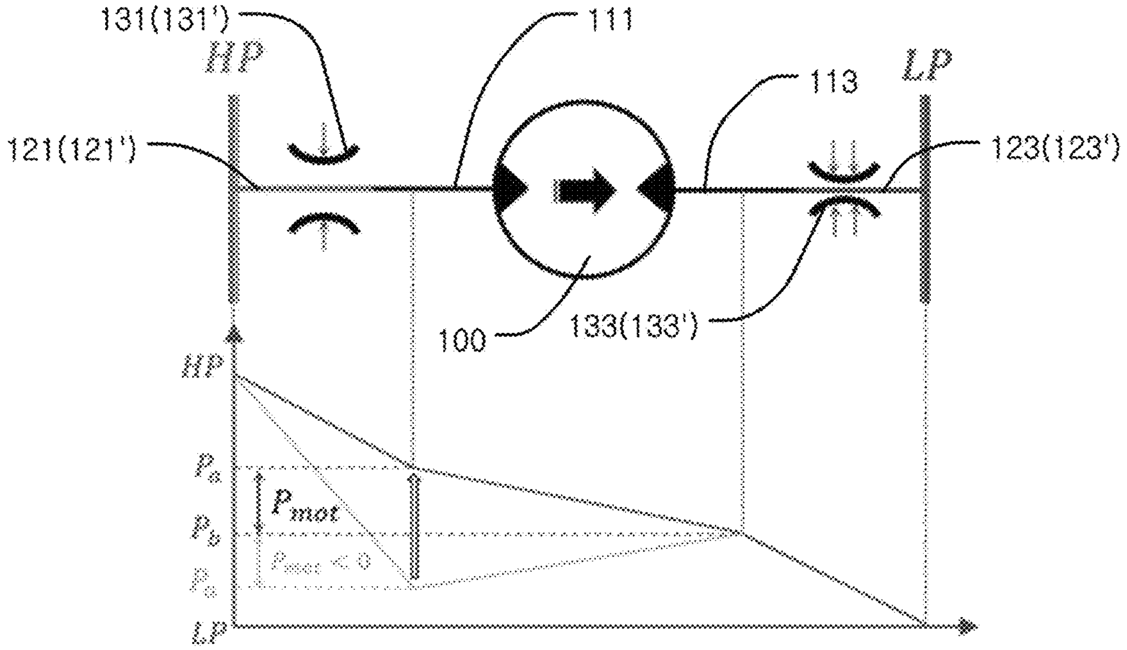
FIG. 6 is a conceptual view schematically illustrating inlet pressure and outlet pressure of a hydraulic motor when deceleration of the hydraulic motor is initiated according to an example of the present disclosure.

FIG. 6 is a conceptual view schematically illustrating inlet pressure and outlet pressure of a hydraulic motor when deceleration of the hydraulic motor is initiated according to the example of the present disclosure.

As illustrated in FIG. 6, when deceleration of the motor 100 is initiated, the algorithm controls the low pressure line valve 133 to have $K_{vLP}$ so that a large amount of fluid is not sent to the low pressure accumulator 620 through the port B 113. However, the high pressure line valve 131 is controlled to have $K_{vHP}$ greater than $K_{vLP}$ so that fluid is not rapidly dissipated. As a result, pressure in the port A 111 may gradually decrease, thereby preventing the pressure of the motor from being suddenly reversed.

Referring to FIGS. 5 and 6, the novel valve control algorithm according to the example of the present disclosure is configured to control the high pressure line valve A 131 and the low pressure line valve B 133 to have different values of $K_v$ in order to prevent pressure shock.

In some examples, when the command normalized flow factor $K_{vcmd}$ corresponding to a command input by the operator input device 750 is $0<K_{vcmd}<1$, the control unit may control the valves so that $K_{vLP}<K_{vHP}$.

In some examples, when $K_{vcmd}=0$ or $K_{vcmd}=1$, the control unit may control the valves so that $K_{vHP}=K_{vLP}$.

In some examples, when $K_{vcmd}=0$ or $K_{vcmd}=1$, the control unit may control the valves so that $K_{vcmd}=K_{vHP}=K_{vLP}$.

In some examples, when $0<K_{vcmd}<1$, the control unit may control the valves so that $K_{vLP}<K_{vcmd}<K_{vHP}$.

Figure 7:
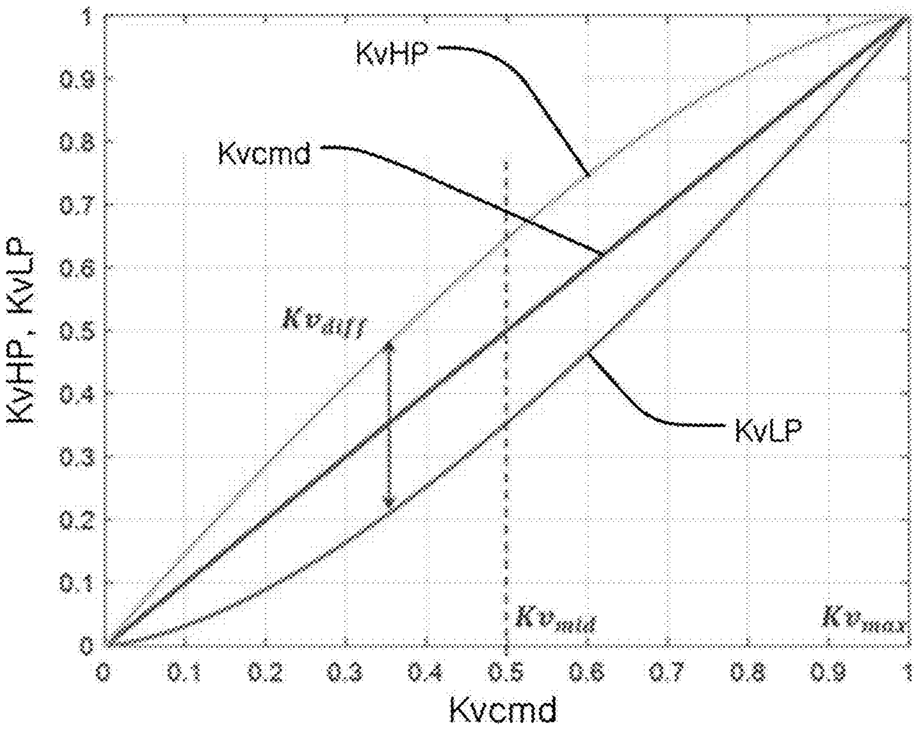
FIG. 7 is a graph illustrating the relationship between $K_{vHP}$ and $K_{vLP}$ modified according to a control method according to an example of the present disclosure.

FIG. 7 is a graph illustrating the relationship between $K_{vHP}$ and $K_{vLP}$ modified according to a control method according to an example of the present disclosure.

FIG. 7 illustrates the example in which a valve control algorithm is more advanced than the valve control algorithm according to the example illustrated in FIGS. 5 and 6.

In FIG. 7, the X-axis and the Y-axis indicate values of normalized $K_v$. In the left area of the graph illustrated in FIG. 7, $K_{vHP}$ has a more rapid increase than $K_{vLP}$. In this area, with increases in $K_{vcmd}$, the difference between $K_{vHp}$ and $K_{vLP}$ also increases.

$$\frac{d}{dt}Kv_{diff} = \frac{d}{dt}(Kv_{AHP} - Kv_{BLP}) > 0 \ \ldots \ \{0 \le Kv_{cmd} < 0.5\}$$

Past a midpoint, $K_{vLP}$ has a more rapid increase than $K_{vHP}$. In this area, the difference between $K_{vHp}$ and $K_{vLP}$ increases with decreases in $K_{vcmd}$.

$$\frac{d}{dt}Kv_{diff} = \frac{d}{dt}(Kv_{AHP} - Kv_{BLP}) < 0 \ \ldots \ \{0 < Kv_{cmd} \le 1\}$$

From FIG. 7, it may be appreciated that the difference between the values of $K_v$ is the maximum at the midpoint (where $K_v=0.5$).

In addition, the present disclosure provides a method of controlling a hydraulic machine. The method of controlling a hydraulic machine may include: receiving a command input by the operator input device 750; determining a normalized flow factor $K_{vcmd}$ corresponding to the input command; controlling the high pressure line valve A 131 to have a normalized flow factor $K_{vHP}$; and controlling the low pressure line valve B 133 to have a normalized flow factor $K_{vLP}$.

In some examples, the valves may be controlled so that $K_{vLP}<K_{vHP}$ when $0<K_{vcmd}<1$.

In some examples, the valves may be controlled so that $K_{vHP}=K_{vLP}$ when $K_{vcmd}=0$ or $K_{vcmd}=1$.

In some examples, the valves may be controlled so that $K_{vcmd}=K_{vHP}=K_{vLP}$ when $K_{vcmd}=0$ or $K_{vcmd}=1$.

In some examples, the valves may be controlled so that $K_{vLP}<K_{vcmd}<K_{vHP}$ when $0<K_{vcmd}<1$.

In addition, the present disclosure may provide a computer program including program code for performing respective operations of the above-described method of controlling a hydraulic machine when executed on a computer or a processing circuit of a control unit and a computer readable medium storing the computer program.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A hydraulic machine comprising:

a hydraulic motor;

a high pressure line connected to the hydraulic motor to allow working fluid to flow into the hydraulic motor;

a low pressure line connected to the hydraulic motor to allow working fluid to flow out of the hydraulic motor;

a high pressure line valve configured to open and close the high pressure line;

a low pressure line valve configured to open and close the low pressure line;

an operator input device configured to input a command to control movement of the hydraulic motor; and a control unit configured to receive the command from the operator input device and control the high pressure line valve and the low pressure line valve to be opened and closed in response to the command, wherein the control unit:

controls the high pressure line valve to have a degree of opening corresponding to a normalized flow factor KvHP;

controls the low pressure line valve to have a degree of opening corresponding to a normalized flow factor KvLP; and in response to each of a rotation of the hydraulic motor being initiated and a deceleration of the hydraulic motor being initiated, prevents a pressure shock in the hydraulic motor by controlling the line valves to exhibit $KvLP<KvHP$ when a normalized flow factor Kvcmd corresponding to the command is $0<Kvcmd<1$.

2. The hydraulic machine of claim 1, wherein $KvHP=KvLP$ when $Kvcmd=0$ or $Kvcmd=1$.

3. The hydraulic machine of claim 2, wherein $Kvcmd=KvHP=KvLP$ when $Kvcmd=0$ or $Kvcmd=1$.

4. The hydraulic machine of claim 1, wherein $KvLP<Kvcmd<KvHP$ when $0<Kvcmd<1$.

5. The hydraulic machine of claim 1, wherein the hydraulic motor comprises a port A and a port B through which working fluid flows in and out, the high pressure line comprises a high pressure line A connected to the port A and a high pressure line B connected to the port B, the low pressure line comprises a low pressure line A connected to the port A and a low pressure line B connected to the port B, the high pressure line valve comprises a high pressure line valve A configured to open and close the high pressure line A and a high pressure line valve B configured to open and close the high pressure line B, the low pressure line valve comprises a low pressure line valve A configured to open and close the low pressure line A and a low pressure line valve B configured to open and close the low pressure line B, when a command to rotate the hydraulic motor in a first direction is input to the operator input device, the control unit controls the high pressure line valve A to be opened by a degree of opening corresponding to KvHP and controls the low pressure line valve B to be opened by a degree of opening corresponding to KvLP, and when a command to rotate the hydraulic motor in a second direction opposite to the first direction is input to the operator input device, the control unit controls the high pressure line valve B to be opened by a degree of opening corresponding to KvHP and controls the low pressure line valve A to be opened by a degree of opening corresponding to KvLP.

6. The hydraulic machine of claim 5, wherein, when the command to rotate the hydraulic motor in the first direction is input to the operator input device, the high pressure line valve B and the low pressure line valve A are closed, and when the command to rotate the hydraulic motor in the second direction opposite to the first direction is input to the operator input device, the high pressure line valve A and the low pressure line valve B are closed.

7. The hydraulic machine of claim 6, wherein, when a command to stop the hydraulic motor rotating in the first direction is input to the operator input device, the high pressure line valve B and the low pressure line valve A are maintained in a closed state, and the control unit controls the low pressure line valve A to be temporarily opened and then closed as a speed of the rotation in the first direction approaches 0, and when a command to stop the hydraulic motor rotating in the second direction is input to the operator input device, the high pressure line valve A and the low pressure line valve B are maintained in a closed state, and the control unit controls the low pressure line valve B to be temporarily opened and then closed as a speed of the rotation in the second direction approaches 0.

8. The hydraulic machine of claim 1, further comprising:

a high pressure accumulator connected to the high pressure line; and a low pressure accumulator connected to the low pressure line.

9. The hydraulic machine of claim 8, further comprising a regenerative pump configured to receive working fluid returned from the low pressure accumulator, pressurize the received working fluid, and direct the pressurized working fluid toward the high pressure accumulator.

10. The hydraulic machine of claim 8, further comprising:

a tank configured to store working fluid; and a basic pump configured to receive working fluid from the tank, pressurize the received working fluid, and direct the pressurized working fluid toward the high pressure accumulator.

11. The hydraulic machine of claim 8, further comprising at least one hydraulic cylinder, wherein the at least one hydraulic motor and the at least one hydraulic cylinder are connected to the high pressure accumulator in common, and the at least one hydraulic motor and the at least one hydraulic cylinder are connected to the low pressure accumulator in common.

12. The hydraulic machine of claim 1, wherein the hydraulic motor comprises a hydraulic motor for a swing operation of an excavator or a hydraulic motor for a travel operation of the excavator.

13. A method of controlling a hydraulic machine, wherein the hydraulic machine comprises:

a hydraulic motor;

a high pressure line connected to the hydraulic motor to allow working fluid to flow into the hydraulic motor;

a low pressure line connected to the hydraulic motor to allow working fluid to flow out of the hydraulic motor;

a high pressure line valve configured to open and close the high pressure line;

a low pressure line valve configured to open and close the low pressure line; and an operator input device configured to input a command to control movement of the hydraulic motor, the method comprising:

receiving a command input by the operator input device;

determining a normalized flow factor Kvcmd corresponding to the command;

controlling the high pressure line valve to have a degree of opening corresponding to a normalized flow factor KvHP;

controlling the low pressure line valve to have a degree of opening corresponding to a normalized flow factor KvLP; and in response to each of a rotation of the hydraulic motor being initiated and a deceleration of the hydraulic motor being initiated, prevents a pressure shock in the hydraulic motor by controlling the line valves to exhibit $KvLP<KvHP$ when $0<Kvcmd<1$.

14. The method of claim 13, wherein $KvHP=KvLP$ when $Kvcmd=0$ or $Kvcmd=1$.

15. The method of claim 14, wherein $Kvcmd-KvHP=KvLP$ when $Kvcmd=0$ or $Kvcmd=1$.

16. The method of claim 13, wherein $KvLP<Kvcmd<KvHP$ when $0<Kvcmd<1$.

17. A computer program comprising program code for performing the operations recited in claim 13 when executed on a computer or a processing circuit of a control unit.

18. A computer readable medium storing a computer program comprising program code for performing the operations recited in claim 13 when executed on a computer or a processing circuit of a control unit.

* * * * *